(12) United States Patent
Brown et al.

(10) Patent No.: US 11,033,813 B2
(45) Date of Patent: Jun. 15, 2021

(54) LATENCY ERASURE

(71) Applicant: Microsoft Technology Licensing, LLC, Redmond, WA (US)

(72) Inventors: Morgan A. Brown, Redmond, WA (US); Shawn Farkas, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 16/434,568

(22) Filed: Jun. 7, 2019

(65) Prior Publication Data

US 2020/0384359 A1    Dec. 10, 2020

(51) Int. Cl.
*A63F 13/30* (2014.01)
*A63F 13/20* (2014.01)
*A63F 13/71* (2014.01)

(52) U.S. Cl.
CPC ............ *A63F 13/30* (2014.09); *A63F 13/20* (2014.09); *A63F 13/71* (2014.09)

(58) Field of Classification Search
CPC .......... A63F 13/20; A63F 13/30; A63F 13/71; A63F 13/358; A63F 2300/534
USPC .......................................................... 463/42
See application file for complete search history.

(56) References Cited

U.S. PATENT DOCUMENTS

| | | | | |
|---|---|---|---|---|
| 6,415,317 | B1 * | 7/2002 | Yelon | A63F 13/12 709/205 |
| 8,069,258 | B1 * | 11/2011 | Howell | H04L 65/80 709/230 |
| 8,678,929 | B1 * | 3/2014 | Nishimura | A63F 13/12 463/42 |
| 8,806,054 | B1 * | 8/2014 | Overton | H04L 67/141 709/232 |
| 8,832,772 | B2 | 9/2014 | Perlman et al. | |
| 9,492,741 | B2 | 11/2016 | Russo et al. | |
| 9,717,982 | B2 * | 8/2017 | Quinn | A63F 13/358 |
| 10,589,171 | B1 * | 3/2020 | Burke | H04N 21/4781 |
| 2009/0215538 | A1 * | 8/2009 | Jew | H04L 65/80 463/42 |

(Continued)

OTHER PUBLICATIONS

Eliot, et al., "Optimize Input Latency for Universal Windows Platform (UWP) DirectX games", Retrieved From: https://docs.microsoft.com/en-us/windows/uwp/gaming/optimize-performance-for-windows-store-direct3d-11-apps-with-coredispatcher, Feb. 8, 2017, 9 Pages.

(Continued)

*Primary Examiner* — Chase E Leichliter
(74) *Attorney, Agent, or Firm* — Rainier Patents, P.S.

(57) ABSTRACT

The present concepts relate to erasing the delay effects caused by latency. A server may model an environment. The server may transmit a series of state information relating to the state of the environment to a client. The client may receive an input provided by a user. In response, the client may transmit the input along with the state information to the server, where the state information corresponds to the state of the environment from the user's perspective at the time the user provided the input. The server may process the input according to the state information received with the input rather than the state of the environment being modeled by the server at the time the input is received by the server. Accordingly, the user may experience that the server is responsive to her inputs as though there were no latency.

20 Claims, 7 Drawing Sheets

(56) References Cited

U.S. PATENT DOCUMENTS

| | | | | |
|---|---|---|---|---|
| 2011/0263332 | A1* | 10/2011 | Mizrachi | A63F 13/358 463/42 |
| 2012/0004040 | A1* | 1/2012 | Pereira | A63F 13/355 463/42 |
| 2012/0004041 | A1* | 1/2012 | Pereira | A63F 13/352 463/42 |
| 2013/0129317 | A1* | 5/2013 | Moorer | H04N 21/2343 386/241 |
| 2013/0132462 | A1* | 5/2013 | Moorer | H04N 21/47217 709/203 |
| 2013/0344960 | A1* | 12/2013 | Perry | A63F 13/12 463/32 |
| 2014/0179421 | A1 | 6/2014 | Quinn et al. | |
| 2014/0274368 | A1* | 9/2014 | Cotter | A63F 13/87 463/31 |
| 2014/0292751 | A1* | 10/2014 | Azar | A63F 13/355 345/420 |
| 2014/0365412 | A1* | 12/2014 | Mizrachi | A63F 13/422 706/14 |
| 2015/0281029 | A1 | 10/2015 | Callahan et al. | |
| 2016/0180811 | A1* | 6/2016 | Colenbrander | G06T 7/90 345/207 |
| 2016/0219325 | A1* | 7/2016 | Chu | A63F 13/35 |
| 2017/0060286 | A1* | 3/2017 | Gasselin de Richebourg | G06F 3/0346 |
| 2017/0060287 | A1* | 3/2017 | Gasselin de Richebourg | G06F 3/04886 |
| 2017/0094342 | A1 | 3/2017 | Lugtenberg et al. | |
| 2018/0310019 | A1* | 10/2018 | Kopietz | A63F 13/35 |
| 2019/0321725 | A1* | 10/2019 | Zimring | A63F 13/358 |
| 2019/0321727 | A1* | 10/2019 | Rodgers | A63F 13/335 |
| 2019/0364302 | A1* | 11/2019 | Perlman | A63F 13/355 |
| 2020/0269140 | A1* | 8/2020 | Peterke | A63F 13/497 |
| 2020/0289937 | A1* | 9/2020 | Osman | A63F 13/58 |

OTHER PUBLICATIONS

Orland, Kyle, "PS4 Share Play impressions: Here, have a Laggy Internet", Retrieved From: https://arstechnica.com/gaming/2014/10/ps4-share-play-impressions-here-have-a-laggy-internet-controller/, Oct. 31, 2014, 3 Pages.

"International Search Report and Written Opinion Issued in PCT Application No. PCT/US20/030338", dated Aug. 11, 2020, 10 Pages.

* cited by examiner

LATENCY ERASURE

BACKGROUND

Latency is a common issue that plagues interactive computing. As more people and more devices around the globe are becoming connected, the time interval between when an input is provided and when a resulting response is received can be substantial. Therefore, latency can create undesirable asynchronous effects that a user may perceive as delayed responses to the user's inputs.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Figure 1:
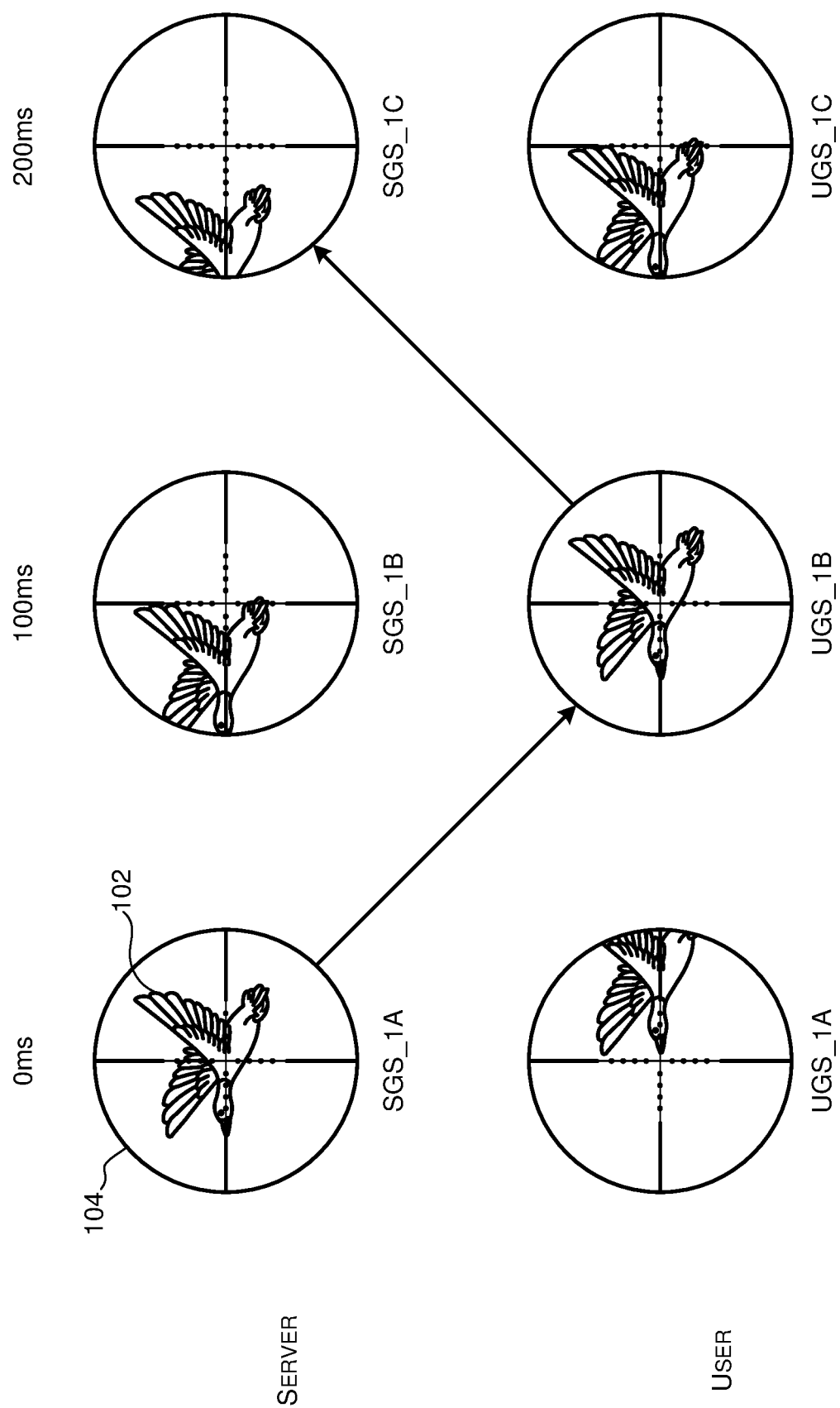
FIG. 1 illustrates example game states in a first-person shooter video game, consistent with the present concepts.

The present concepts generally relate to reducing delayed response effects (often called lag) resulting from latency. Latency may be caused by a slow-speed network connection, a far distant network connection, slow processing capability, and/or an overloaded processing resource. Any of these types of latency could cause a user who provides an input to perceive a delayed asynchronous response by a remote computer rather than an almost immediate response that the user expects. For example, where the user is separated from the remote computer by a network (e.g., the Internet), there may be a delay from the time the user provided an input (e.g., a command or a signal) to the time the remote computer receives the input. Moreover, there may be additional delay from the time the remote computer transmits its response to the user's input to the time the user receives the response. This round-trip delay can become significantly noticeable by the user as latency increases.

For example, in a conventional video game that is played over a network, the user's gaming experience may be significantly impacted by latency. That is, the user may have a poor experience if the time that it takes for the remotely-executed video game to respond to the user's inputs is too high. Many video games have objectives that require the user to quickly provide a specific input within a short time window, thus testing the user's ability to react quickly. Unfortunately, if the latency is too high, the delay in communicating the necessary input from the user to the video game due to latency may make it difficult or even impossible for the user to successfully provide the necessary input in time from the video game's perspective. Conventional video games that simply process a user input as it is received could incorrectly determine that the user missed the time window when in fact, from the user's perspective, the user provided the appropriate input at the right time. Such a result can frustrate and even anger the user who may feel that the video game has unfairly and incorrectly scored the user's performance in playing the video game.

Conventional video games have generally tried to address latency by attempting to determine how long ago the user actually provided an input. For example, some conventional video games time-stamp the input from the user and then subtract the approximate latency time from the received time stamp to estimate the approximate time when the user actually provided the input. However, this conventional method has several drawbacks. First, it is difficult to accurately estimate the latency time due to network jitter and other factors that change network conditions. Second, this conventional method only accounts for one-way latency from the user to the video game; it does not account for the latency from the video game to the user in the other direction. Accordingly, conventional video games may not know how long it took for the video frames to be transmitted and then be displayed to the user. Other conventional video games attempt to deal with latency by associating user inputs with video frame numbers. This conventional technique also has several disadvantages. First, simply counting video frames fails to account for dropped frames that may never reach the user, which may be common in network communications. Second, when the video game receives a user input along with a video frame counter value, the video game would have to ascertain the past state of the video game based on the received video frame counter value either by caching the video game world states or by running the game simulation backwards (i.e., rewinding).

To solve the above-described problems with conventional methods of processing user inputs as well as to address other disadvantages associated with latency, the present concepts involve a novel scheme for processing user inputs that may remove or erase the user's perception of latency. For instance, a computer may send state information to an input device that the user is using to provide an input, and the input device may send back the input along with the state information to the computer. In response, the computer may process the input based on the state information that the user was perceiving at the time when the input was initially provided by the user, not at the later time when the input was actually received by the computer. Therefore, the computer may process the input as though it were provided instantaneously and as through there were no latency. Moreover, the user may perceive the computer responding accurately and instantaneously, thus providing a more satisfying experience. The present concepts will be described in more detail below with accompanying figures.

FIG. 1 illustrates example game states from a first-person shooter video game, consistent with some implementations of the present concepts. In this example shooter game, a server may model a simulation of a virtual game world that has virtual objects including, for example, a duck 102, through a series of time periods. The server may control the movement of the duck 102. A user may play the game using a client, for example, by viewing video frames displayed by the client and by providing inputs to the client. In this example, the user may control a virtual rifle having a scope 104 with crosshairs to help aim at virtual targets, such as the duck 102. The user may also be able to provide an input to fire the rifle at whatever the scope 104 is pointing at, i.e., where the crosshairs intersect.

The top row in FIG. 1 shows a time-progressing series of game states from the server's perspective. In this example, the duck 102 may be flying from right to left in the field of view of the scope 104. For example, at 0 ms, a server game state SGS_1A has the crosshairs aimed at the duck 102, i.e., on target. At 100 ms, a server game state SGS_1B has the duck 102 flown a bit left in the field of view of the scope 104 such that the crosshairs are no longer aimed at the duck 102, i.e., off target. At 200 ms, a server game state SGS_1C has the duck 102 flown even further left, such that the crosshairs are far off target. The server may be modeling the virtual world by simulating these three example game states as well as many more game states before, in between, and after the three example game states depicted in FIG. 1. The server may model the virtual world based on, for example, predefined game scenarios, game rules, various factors including randomness, and/or user inputs.

The bottom row in FIG. 1 shows a time-progressing series of game states from the user's perspective. For example, at 0 ms, a user game state UGS_1A has the duck 102 on the right side of where the crosshairs intersect and flying towards the intersection. At 100 ms, a user game state UGS_1B has the crosshairs aimed at the duck 102, i.e., on target. The user game state UGS_1B may correspond to the server game state SGS_1A. At 200 ms, a user game state UGS_1C has the duck 102 flown a bit left in the field of view of the scope 104 such that the crosshairs are no longer aimed at the duck 102, i.e., off target. The user game state UGS_1C may correspond to the server game state SGS_1B. The client may be outputting video, audio, haptic feedback, or any other types of output that correspond to the game states to the user.

In this example, the client may be separated from the server by 100 ms latency. Accordingly, if the server transmits a video frame reflecting the server game state SGS_1A to the client at 0 ms, it may take 100 ms for that video frame to be displayed by the client to the user at 100 ms. Additionally, if the user provides an input to the client at 100 ms, it may take 100 ms for the server to receive the input from the client at 200 ms. Although 100 ms is used here as a simplified example, the latency from the server to the client may be different from the latency from the client to the server. Furthermore, latency may not remain constant. Network jitter and other factors can cause latency to vary greatly at different times. The effectiveness of the present concepts does not vary with fluctuating latency, which is another advantage over conventional techniques.

With conventional video games, the user may perceive significant lag due to the latency between the server and the client. For instance, the server that is running the game simulation may require that the user provide a shot firing input at 0 ms when the crosshairs are over the duck 102 in the server game state SGS_1A. However, from the user's perspective, at 0 ms, the duck 102 has not yet flown into the intersection of the crosshairs in the user game state UGS_1A and thus it would be too early to shoot. Rather, from the user's perspective, the crosshairs would be on target over the duck 102 at 100 ms in the user game state UGS_1B, due to the 100 ms latency from the server to the client. Accordingly, the user would provide a shot firing input to the client at 100 ms. Moreover, the server would receive the shot firing input from the client at 200 ms due to the 100 ms latency from the client to the server. Unfortunately, from the server's perspective, at 200 ms, the duck 102 has already flown far away from the intersection of the crosshairs in the server game state SGS_1C. Accordingly, the server would register a missed shot (i.e., fired too late) by the user, even though the user fired on target (i.e., fired at the correct time) from the user's perspective. This undesirable effect of conventional video games is unfair to the user who has high latency and can often cause dissatisfaction, frustration, and anger by the user.

To address these disadvantages of conventional video games, the present concepts can implement a novel scheme for processing user inputs. Consistent with some implementations of the present concepts, the server may transmit game state information to the client. For example, the server may transmit the location coordinates of the duck 102 to the client. Alternatively or additionally, the server may transmit a Boolean value indicating whether the crosshairs of the scope 104 are on target or off target to the client. Furthermore, when the user provides an input to the client, in addition to the client transmitting the input to the server, the client may also transmit the game state information to the server. That is, the input (e.g., a shot firing input) transmitted from the client to the server may be accompanied by game state information (e.g., the location coordinates of the duck 102 or an on-target or off-target Boolean value) that corresponds to the time when the user provided the input from the user's perspective. In response, the server may process the received input based on the game state information received from the client along with the input rather than the current state that the game simulation is in at the time the input was received by the server.

For instance, in the example shown in FIG. 1, at 0 ms, the server may transmit game state information corresponding to the server game state SGS_1A along with a corresponding video frame to the client. At 100 ms, the client may receive the game state information corresponding to the server game state SGS_1A (which is the same as the user game state UGS_1B) and the video frame from the server, and may display the video frame to the user. Also at 100 ms, the user may provide a shot firing input to the client. In response, the client may transmit the input along with game state information corresponding to the server game state SGS_1A (i.e., corresponding to the user game state UGS_1B) to the server. At 200 ms, the server may receive the shot firing input and the game state information corresponding to the server game state SGS_1A from the client. In response, the server may manipulate the simulated virtual game world based on the shot firing input and the server game state SGS_1A rather than the current game state SGS_1C at 200 ms. Accordingly, consistent with the present concepts, the server may respond to the shot firing input by registering a hit on the duck 102 because the receive game state information corresponds to the server game state SGS_1A, which has the crosshairs over the duck 102. Whereas, a conventional game would have registered a missed shot in response to the shot firing input received at 200 ms, because the server game state SGS_1C at 200 ms has the crosshairs far away from the duck 102. Therefore, the present concepts may be capable of reducing or eliminating the lag effect that would conventionally result from the latency between the server and the client, thereby providing the user with a perception of synchronous response by the server.

Figure 2:
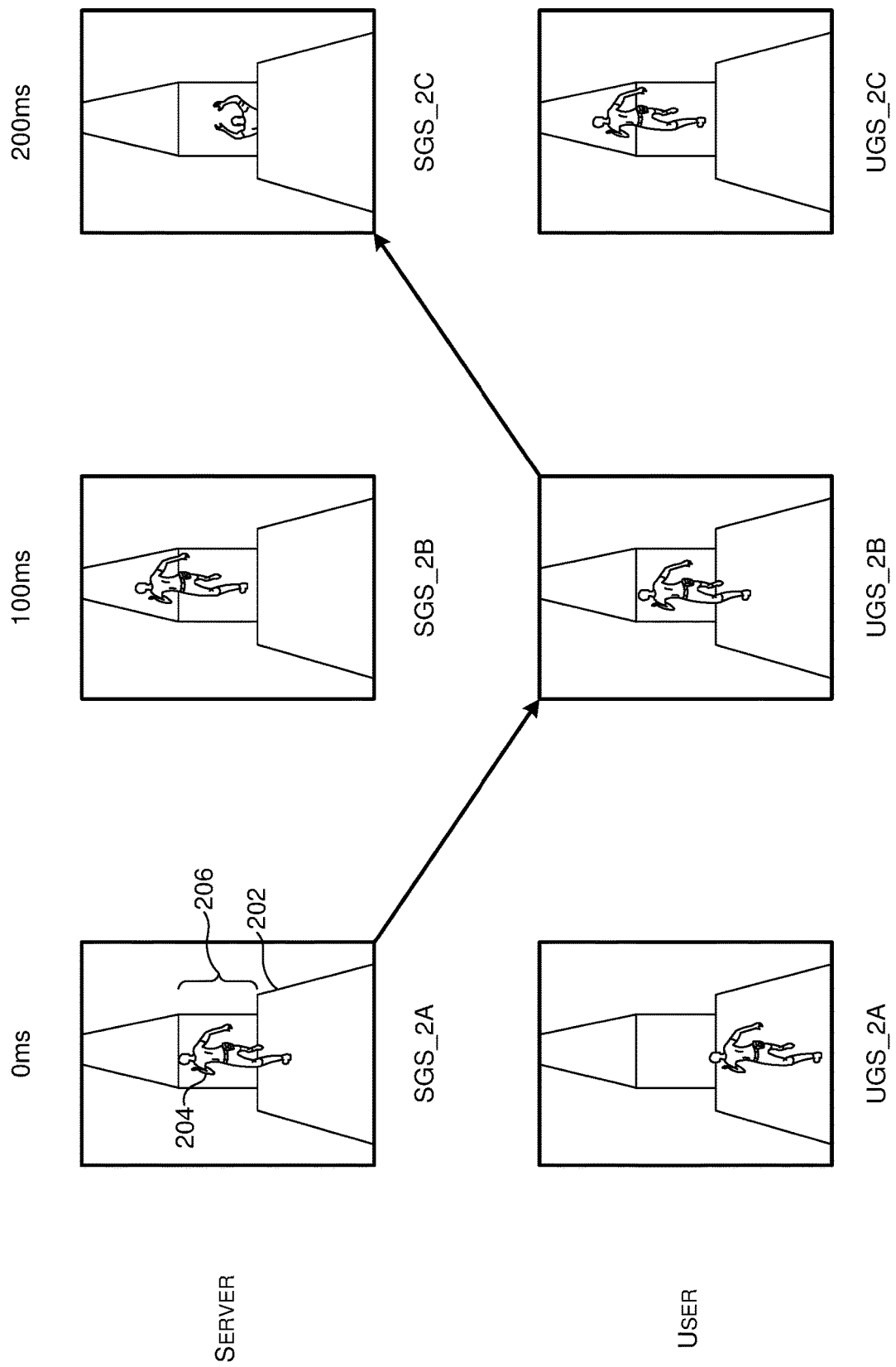
FIG. 2 illustrates example game states in a platformer video game, consistent with the present concepts.

FIG. 2 illustrates example game states from a platformer video game, consistent with some implementations of the present concepts. In this example platformer game, a server may model a simulation of a virtual game world that has virtual objects including, for example, a track 202 and a runner 204. The server may simulate the virtual game world in which the runner 204 may be running on the track 202. A user may play the video game using a client, for example, by viewing video frames displayed by the client and by providing inputs to the client. In this example, the user may control the position of the runner 204 on the track 202 and/or the speed of the runner 204. The user may also be able to provide an input to cause the runner 204 to jump. For example, the track 202 may include a gap 206, such as a cliff, that the runner 204 must jump over to remain alive in the game. This example game requires the user to provide a jump input at the right time, i.e., when the runner 204 is in the correct position before the runner 204 runs into the cliff.

The top row in FIG. 2 shows a time-progressing series of game states from the server's perspective. In this example, the runner 204 may be running up the track 202. For example, at 0 ms, a server game state SGS_2A has the runner 204 on the track 202 just before the gap 206. At 100 ms, a server game state SGS_2B has the runner 204 off the track 202 and over the gap 206. At 200 ms, a server game state SGS_1C has the runner 204 falling into the gap 206, i.e., falling over the cliff. The server may be modeling the virtual world as it transitions through a series of game states, including the three example game states depicted in FIG. 2. The server may model the virtual world based on, for example, predefined game scenarios, game rules, various factors including randomness, and/or user inputs.

The bottom row in FIG. 2 shows a time-progressing series of game states from the user's perspective. For example, at 0 ms, a user game state UGS_2A has the runner 204 on the track 202 and approaching the gap 206 but too early to jump and clear the gap 206. At 100 ms, a user game state UGS_2B has the runner 204 on the track 202 just before the gap 206, such that jumping from this position would result in a successful jump across the gap 206. The user game state UGS_2B may correspond to the server game state SGS_2A. At 200 ms, a user game state UGS_2C has the runner 204 off the track 202 and over the gap 206. The user game state UGS_2C may correspond to the server game state SGS_2B. The client may be outputting video, audio, haptic feedback, or any other types of output that correspond to the game states to the user.

Similar to the example in FIG. 1, in the example shown in FIG. 2, the client may be separated from the server by 100 ms latency. Accordingly, if the server transmits a video frame reflecting the server game state SGS_2A to the client at 0 ms, it may take 100 ms for that video frame to be displayed by the client to the user at 100 ms. Additionally, if the user provides an input to the client at 100 ms, it may take 100 ms for the server to receive the input from the client at 200 ms.

With conventional video games, the user may perceive significant lag due to the latency between the server and the client. For instance, the server that is running the game simulation may require that the user provide a jump input at 0 ms, i.e., in the server game state SGS_2A, when the runner 204 is at or near the edge of the track 202 just before the runner reaches the gap 206. However, from the user's perspective, at 0 ms, the runner 204 is not yet close enough to the gap 206 to jump in the user game state UGS_2A and thus it would be too early to jump. Rather, from the user's perspective, the runner 204 would be in position to jump over the gap 206 at 100 ms in the user game state UGS_1B, due to the 100 ms latency from the server to the client. Accordingly, the user would provide a jump input to the client at 100 ms. Moreover, the server would receive the jump input from the client at 200 ms due to the 100 ms latency from the client to the server. Unfortunately, from the server's perspective, at 200 ms, the runner 204 has already run off the cliff and fallen into the gap 206 in the server game state SGS_1C. Accordingly, the server would register a failed jump (i.e., jumped too late) by the user, even though the user jumped in time (i.e., jumped at the correct time) from the user's perspective. This undesirable effect of conventional video games is unfair to the user who has high latency and can provide unfavorable gaming experience.

To address these disadvantages of conventional video games, the present concepts can implement a novel scheme for processing user inputs. Consistent with some implementations of the present concepts, the server may transmit game state information to the client. For example, the server may transmit the position of the runner 204 and/or the position of the gap 206 to the client. Alternatively or additionally, the server may transmit a Boolean value indicating whether the runner 204 is running on the track 202 or flying through the air (i.e., not over the track 202) to the client. Furthermore, when the user provides an input to the client, in addition to the client transmitting the input to the server, the client may also transmit the game state information to the server. That is, the input (e.g., a jump input) transmitted from the client to the server may be accompanied by game state information (e.g., the position of the runner 204, the position of the gap 206, and/or a ground-or-air Boolean value) that corresponds to the time when the user provided the input from the user's perspective. In response, the server may process the received input based on the game state information received from the client along with the input rather than the current state that the game simulation is in at the time the input was received by the server.

For instance, in the example shown in FIG. 2, at 0 ms, the server may transmit game state information corresponding to the server game state SGS_2A along with a corresponding video frame to the client. At 100 ms, the client may receive the game state information corresponding to the server game state SGS_2A (which is the same as the user game state UGS_2B) and the video frame from the server, and may display the video frame to the user. Also at 100 ms, the user may provide a jump input to the client. In response, the client may transmit the input along with the game state information corresponding to the server game state SGS_2A (i.e., corresponding to the user game state UGS_2B) to the server. At 200 ms, the server may receive the jump input and the server game state SGS_2A from the client. In response, the server may manipulate the simulated video game world based on the jump input and the server game state SGS_2A rather than the current game state SGS_2C at 200 ms. Accordingly, consistent with the present concepts, the server may respond to the jump input by registering a successful jump over the gap 206 by the runner 204 because the receive game state information corresponds to the server game state SGS_2A, which has the runner 204 at an appropriate position on the track 202 to jump over the gap 206 and land on the far side of the track 202 beyond the cliff. Whereas, a conventional game would have registered a failed jump in response to the jump input received at 200 ms, because the server game state SGS_2C at 200 ms has the runner 204 already falling into the gap 206. Therefore, the present concepts may be capable of reducing or eliminating the lag effect that would conventionally result from the latency between the server and the client, thereby providing the user with a perception of synchronous response by the server.

Although the present concepts have been explained above in connection with example video games illustrated in FIGS. 1 and 2, the present concepts may be implemented in any scenario that involves latency in receiving and processing user inputs. For example, the server may model other types of environments, including virtual reality worlds and augmented realities. The server may also model real life environments. The lag that is perceivable by the user due to latency between the server and the user (e.g., an input device through which the user provides inputs to the server) using conventional techniques may be erased using the present concepts.

Figure 3:
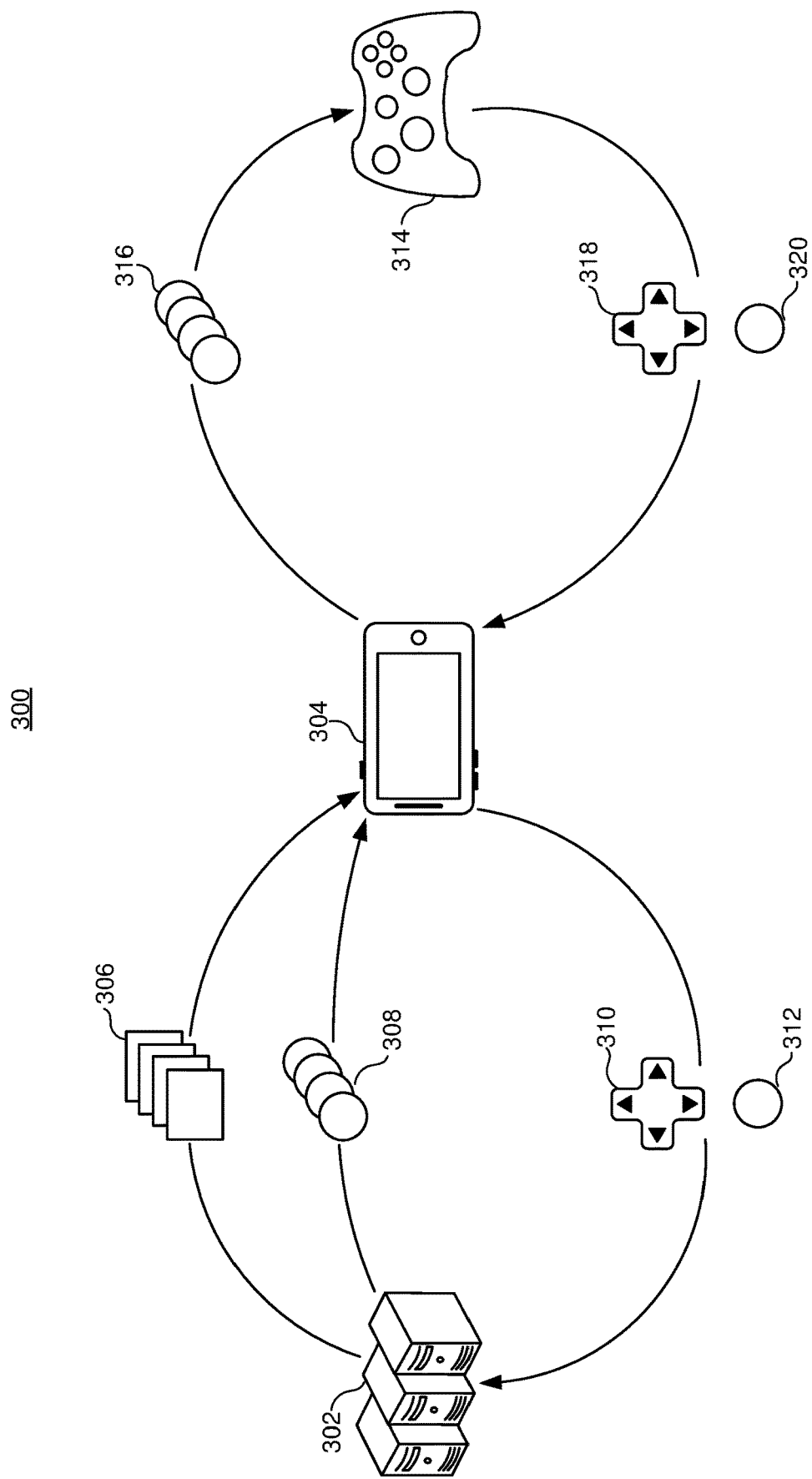
FIG. 3 illustrates an example scheme for processing user inputs, consistent with the present concepts.

FIG. 3 illustrates an example scheme for processing user inputs, consistent with the present concepts. Moreover, FIG. 3 illustrates an example flow of information using the present concepts. FIG. 3 depicts an example system 300. The system 300 may include a server 302. The server 302 may be software, hardware, or a combination thereof. The server 302 may model an environment. For example, the server 302 may model a virtual game environment by running a single-player video game or a multi-player video game. In some implementations, the server 302 may be running a virtual game console that allows one or more remote users to connect and play video games. For instance, the server 302 may be running a first-person shooter video game, like the one illustrated in FIG. 1. The server 302 may model the position, movement, and actions of the duck 102, as well as the position, movement, and the actions of the rifle. In another example, the server 302 may by running a platformer video game, like the one illustrated in FIG. 2. The server 302 may model the position and movement of the track 202, as well as the position, movement, and the actions of the runner 204. In other implementations, the server 302 may model a virtual reality environment or an augmented reality environment that includes various virtual objects as well as real-world objects. The server 302 is not limited to modeling only virtual environments. In other implementations, the server 302 may model a real-world environment. For example, the server 302 may model a stock trading environment, a vehicle traffic environment, a hotel reservation environment, or any other environment with objects and changing states. The server 302 may be any device that has processing capabilities to model an environment and to process inputs and also has communicating capabilities to receive inputs. For example, the server 302 may be a computer device, a video game console, a virtual reality headset, etc.

The system 300 may include a client 304. The client 304 may be software, firmware, hardware, or a combination thereof. The client 304 may be any device and/or any software a user could use to connect to the server 302 and interact with the environment modeled by the server 302. For example, the client 304 may be a personal computer, a laptop, a tablet, a smartphone, a wearable device, a keyboard, a mouse, a microphone, a telephone, a video game console, a video game controller, a virtual reality headset, a virtual reality controller, etc., and/or software and/or firmware running on such a device. The client 304 may be capable of receiving information about the environment modeled by the server 302 and outputting the information to the user. The client 304 may be capable of receiving an input from the user and transmitting the input to the server 302. The client 304 may communicate with the server 302 though one or more networks (not shown) that add latency to the communication.

In some implementations consistent with the present concepts, the server 302 may transmit environment information to the client 304. In the video game examples, the server 302 may generate a series of video frames 306 representing the environment and transmit the video frames 306 to the client 304. For example, with respect to the first-person shooter video game of FIG. 1, the server 302 may transmit video frames 306 showing the duck 102 and the scope 104, as illustrated in FIG. 1, to the client 304. As another example, with respect to the platformer video game of FIG. 2, the server 302 may transmit video frames 306 showing the runner 204 and the track 202, as illustrated in FIG. 2, to the client 304. The server 302 may transmit the video frames 306 on a pre-defined frequency (e.g., 30 frames per second or 60 frames for second), on a variable frequency (e.g., depending on the capabilities of the network connection between the server 302 and the client 304, or depending on the user preferences for the quality of video frames), or on an as-needed basis as the video frames 306 require updating due to the changing environment. The server 302 may transmit other environment information, such as audio (e.g., background music or sound effects), to the client 304. The client 304 may receive the environment information transmitted by the server 302 and output the environment information to the user. For example, the client 304 may display the video frames 306 on a display to be seen by the user, and the client 304 may play the audio using a speaker to be heard by the user.

Consistent with some implementations of the present concepts, the server 302 may generate a series of state information 308 and transmit the state information 308 to the client 304. The state information 308 may include any information that the server 302 would want to know about the state of the environment in order to process an input provided by the user. For example, the state information 308 may include status, a characteristic, and/or an attribute of an object in the environment, such as the position coordinates of the duck 102, the direction and velocity vector of the duck 102, the position coordinates of the scope 104, the distance between the duck 102 and the rifle, the position coordinates of the runner 204, the position coordinates of the gap 206, the speed of the runner 204 relative to the track 202, etc. The state information may be a matrix, a list, a vector, a scalar, a Boolean, or any other data structure. For example, the state information may include a Boolean value indicating whether the crosshairs of the scope 104 are on target or off target with respect to the duck 102, a Boolean value indicating whether the shoot input was provided inside or outside the time window for a successful shot, a Boolean value indicating whether the runner 204 is on a solid ground (i.e., on the track 202) or in the air (i.e., off the track 202), a Boolean value indicating whether the runner 204 is in position on the track 202 to make the jump over the gap 206 or out of position where a jump input would result in a failed jump, or a Boolean value indicating whether the jump input was provided inside or outside the time window for a successful jump. A wide variety of other types of information may be included in the state information 308, such as, player statistics (e.g., health, lives, power, equipment, ammunition, status effects, score, bonus points, attack strength, defense strength, dexterity, amount of money, wins, losses, levels, etc.), enemy statistics, team statistics, in-game timers, movement speed, acceleration, or any other variable. Depending on the environment being modeled by the server 302, the contents of the state information 308 can vary depending on the context and the scenarios being modeled. For example, the designer or developer of the example video games may choose the contents of the state information 308 based on the type and architecture of the video games.

The server 302 may transmit the series of state information 308 on a pre-defined frequency, on a variable frequency, or on an as-needed basis as the state information 308 requires updating due to the changing environment. In some implementations, the state information 308 may have a correspondence with the video frames 306. For example, the corresponding video frame 306 and the state information 308 may share a common time stamp or a common counter value (e.g., a frame counter). As another example, the corresponding video frame 306 and the state information 308 may be transmitted together. That is, the corresponding video frames 306 and the state information 308 may be transmitted together in the same data package, or they may be transmitted together at the same or similar time (i.e., synchronously). In other implementations, there may be no correspondence between the video frames 306 and the state information 308. The series of video frames 306 and the series of state information 308 may be transmitted asynchronously.

In some implementations, the state information 308 transmitted by the server 302 to the client 304 may include contents that describe a certain state regarding the environment (e.g., the position coordinates of an object in the environment). In alternative implementations, the server 302 may locally store the contents, generate a series of tokens in association with the corresponding contents, and transmit the tokens (in lieu of the contents) to the client 304, such that the state information 308 transmitted by the server 302 to the client 304 contains the tokens and not the contents. For example, a particular state information 308 having a token may be an identifier (e.g., a counter, a time stamp, a randomly generated value, or any other data structure) that is associated with the contents stored at the server 302. Transmitting the tokens as the state information 308 instead of the contents may reduce the amount of information that needs to be exchanged between the server 302 and the client 304. Moreover, transmitting the state information 308 as tokens may deter cheaters who could manipulate the contents but may have difficulty interpreting and manipulating the tokens.

With conventional methods, when a client receives an input from a user, the client transmits the input to a server. Accordingly, when the server receives the input, the server processes the input based on whatever state the environment is in at the time the input is received. Consistent with the present concepts, when the client 304 receives an input 310 from the user, the client may transmit the input 310 along with the corresponding state information 312 to the server 302.

In one implementation, the state information 312 may correspond to the input 310, because the state information 312 was the latest in the series of state information 308 that the client 304 had received from the server 302 when the client 304 received the input 310 from the user. In another implementation, the state information 312 may correspond to the input 310, because the state information 312 corresponds to the video frame 306 being displayed to the user at the time the client 304 received the input 310 from the user.

The state information 312 that is returned from the client 304 to the server 302 may include the contents (e.g., the position of an object in the environment) where the server 302 transmits a series of the contents to the client 304. Alternatively, the state information 312 that is returned from the client 304 to the server 302 may include a token where the server 302 transmits a series of tokens to the client 304.

For example, with respect to the first-person shooter video game shown in FIG. 1, when the user provides the input 310 that corresponds to a shoot command at 100 ms, the client 304 may transmit the input 310 along with the state information 312 corresponding to the user game state UGS_1B (which may be the same as the server game state SGS _1A) where the crosshairs of the scope 104 are on target over the duck 102. The state information 312 may include the position coordinates of the duck 102, the position coordinates of the scope 104, the distance between the duck 102 and the rifle, a Boolean value indicating that the scope 104 is on target over the duck 102, or a combination thereof, or a token corresponding to any of the foregoing. As another example, with respect to the platformer video game shown in FIG. 2, when the user provides the input 310 that corresponds to a jump command at 100 ms, the client 304 may transmit the input 310 along with the state information 312 corresponding to the user game state UGS_2B (which may be the same as the server game state SGS_2A) where the runner 204 is in position on the track 202 to jump over the gap 206. The state information 312 may include the position coordinates of the runner 204, the speed of the runner 204, the position coordinates of the gap 206, a Boolean value indicating that the runner 204 is on the track 202, a Boolean value indicating that the runner is in position on the track 202 to jump and clear the gap 206, or a combination thereof, or a token corresponding to any of the foregoing. Consistent with some implementations of the present concepts, the client 304 need not necessarily understand or interpret the state information 308 received from the server 302. The client 304 may receive the state information 308 from the server 302 and simply return one or more of the state information 308 to the server 302 along with the input 310.

Consistent with the present concepts, the server 302 may receive the input 310 and the state information 312 together. That is, the server 302 may receive the input 310 and the state information 312 in the same data package, at the same or similar time, or with a common identifier, or using any other method such that the server 302 can associate with the input 310 with the state information 312. Accordingly, the server 302 may process the input 310 based on the state information 312 that was received with the input 310 rather than based on the state of the environment at the time the input 310 was received.

For example, with respect to the first-person shooter video game shown in FIG. 1, when the server 302 receives the input 310 that corresponds to a shoot command and the state information 312 that corresponds to the server game state SGS_1A at 200 ms, the server 302 may manipulate the environment by executing the shoot command according to the server game state SGS_1A that was received with the input 310 rather than the server game state SGS_1C that the environment is in at 200 ms. Accordingly, the server 302 may register a successful shot, because the input 310 (i.e., the shoot command) was received together with the state information 312 that corresponds to the state where the crosshairs of the scope 104 are on target over the duck 102, despite the fact that the server 302 may be modeling the environment in the server game state SGS_1C where the crosshairs of the scope 104 are off target at 200 ms when the input 310 to shoot the duck 102 was received by the server 302.

As another example, with respect to the platformer video game shown in FIG. 2, when the server 302 receives the input 310 that corresponds to a jump command and the state information 312 that corresponds to the server game state SGS_2A at 200 ms, the server 302 may manipulate the environment by executing the jump command according to the server game state SGS_2A that was received with the input 310 rather than the server game state SGS_2C that the environment is in at 200 ms. Accordingly, the server 302 may register a successful jump, because the input 310 (i.e., the jump command) was received together with the state information 312 that corresponds to the state where the runner 204 is on the track 202 and in the appropriate position to clear the gap 206, despite the fact that the server 302 may be modeling the environment in the server game state SGS_2C where the runner 204 is off the track 202 and falling through the air into the gap 206 at 200 ms when the input 310 to jump was received by the server 302.

These example implementations of the present concepts allow the server 302 to quickly process the input 310, which is another advantage over conventional techniques for dealing with latency. For example, a conventional server may check a time stamp included with an input received from a client, where the time stamp indicates when the client transmitted the input even if the server actually received the input much later due to latency. Alternatively, conventional servers and clients may exchange video frame counters or virtual world clock values along with user inputs. In these scenarios, the conventional server would need to "rewind" the environment being modeled to calculate the state that the environment was in at the appropriate time in the past (based on the time stamp, the video frame counter value, or the virtual world clock time received with the input) in order to know how to process the received input. Such a calculation can take processing resources, but more importantly, take time which may negatively affect the responsiveness of the server from the user's perspective. On the contrary, with the present concepts, the server 302 may generate the state information 308 (as chosen by the video game designer) that would be necessary for the server 302 to quickly process the input 310. For example, with respect to the shooter video game of FIG. 1, the state information 312 returned with the input 310 to the server 302 may include a Boolean indicating whether the crosshairs of the scope 104 are on target or off target. Accordingly, the server 302 will know whether to register a hit or a miss upon receiving the input 310 and can thus process the input 310 very quickly compared to conventional techniques. Similarly, with respect to the platformer video game of FIG. 2, the state information 312 returned with the input 310 to the server 302 may include a Boolean indicating whether the runner 204 is in the proper position on the track 202 to clear the gap 206 or not. Accordingly, when the server 302 receives the input 310 (i.e., the jump command) along with the state information 312, the server 302 may know immediately whether to register a successful jump or a failed jump, and thus can process the input 310 much faster than conventional techniques.

Furthermore, the server 302 may continue to model the environment in accordance with the input 310 that was processed based on the state information 312 that was received with the input 310. That is, the server 302 may continue to generate and transmit subsequent (i.e., future) environment information to the client 304. For example, with respect to the first-person shooter video game shown in FIG. 1, the server 302 may generate a series of video frames 306, sound effects, and/or a series of state information 308 that reflect the rifle successfully shooting the duck 102, such as video frames depicting the duck 102 falling down the air and onto the ground. As another example, with respect to the platformer video game shown in FIG. 2, the server 302 may generate a series of video frames 306, sound effects, and/or a series of state information 308 that reflect the runner 204 successfully jumping over the gap 206, landing on the other side of the cliff, and continuing to run on the other side of the track 202. The server 302 may also award appropriate number of points, bonuses, or lives based on the input 310 to the user, depending on the context of the video game being played.

Accordingly, consistent with the present concepts, the server 302 processes the input 310 from the user as though the input 310 were received at 0 ms, i.e., when the state of the environment modeled by the server 302 (e.g., the server game state SGS_1A or SGS_2A) matches the state of the environment perceived by the user at 100 ms (e.g., the user game state UGS_1B or UGS_2B) when the input 310 was provided by the user, even though the input 310 was actually received much later at 200 ms when the state of the environment modeled by the server 302 (e.g., the server game state SGS_1C or SGS_2C) is different from the state information 312 that was received together with the input 310. Therefore, using the present concepts, the user may perceive the server 302 reacting instantaneously or synchronously with the input 310 that the user provided to the client 304 without the conventional lag and delay effects associated with latency caused by slow networks and/or slow devices. The present concepts thus allow the user to have more pleasant and realistic experience interacting with the server 302 through a network using the client 304 (e.g., to play video games). Moreover, the present concepts can provide a more fair multiplayer video game experience by reducing or eliminating the advantages that low-latency players conventionally have over high-latency players.

To the extend the state of the environment being modeled by the server 302 at the time the input 310 is received (e.g., the server game state SGS_1C or SGS_2C at 200 ms) conflicts with the state information 312 that is received along with the input 310 (e.g., the server game state SGS_1A or SGS_2A at 0 ms), the server 302 may employ one or more conflict resolution techniques. These conflict resolution techniques may be used in conjunction with the present concepts. Where the latency is large, the need for the conflict resolution techniques is greater, and also the effects of the conflict resolution techniques can become exaggerated. For example, the server 302 may need to "rewind" the simulation of the environment that the server 302 had modeled before the server 302 received the input 310 (i.e., reverse the modeling of the environment) and remodel the environment with different results (i.e., forward model the environment) according to the input 310 that had been processed. In some implementations, a time stamping technique may be used. As such, it may be possible for the user playing the first-person shooter video game of FIG. 1 to see video frames reflecting the rifle shooting at the duck 102 but missing so that the duck 102 continues to fly through the air for a bit as shown in the server game state SGS_1C and then the duck 102 suddenly falling as though it was shot, after the server 302 registered the input 310 later due to latency. It may also be possible for the user playing the platformer video game of FIG. 2 to see video frames reflecting the runner 204 failing to jump and thus falling through the air into the gap 206 as shown in the server game state SGS_2C and then the runner 204 suddenly appearing on the other side of the track 202 as though the runner 204 had jumped in time and cleared the gap 206, after the server 302 registered the input 310 later due to latency. Although the server 302 may receive the input 310 with delay due to latency, the effect that the input 310 has on the environment may be as though the server 302 received the input 310 instantaneously without latency, consistent with the present concepts.

As latency increases, the conflict resolution effects may be even more exaggerated. To reduce the number and the degree to which the server 302 may need to correct the environment for delayed inputs due to latency between the server 302 and the client 304, the server 302 and/or the client 304 may use a prediction technique by predicting the inputs the user is likely to provide and proactively generating the effects of the predicted inputs. For example, the client 304 may generate video frames depicting the rifle firing and/or the duck 102 being shot in response to a shooting input provided by the user even before the shooting input reaches the server 302 and before the server registers that the duck 102 has been shot. As another example, the server 302 may generate video frames depicting the runner 204 jumping at the end of the track 202 and over the gap 206 even before the server 302 receives a jump input from the client 304. That is, the server 302 and/or the client 304 may assume that the user will provide the correct inputs as the video game progresses, and if the expected inputs are not received (e.g., within a time window tolerance), the server 302 and/or the client 304 may "rewind" and correct the environment for the lack of correct inputs.

Moreover, for multiplayer games, the server 302 may use a buffering technique, where the server 302 receives inputs from one or more users, buffers those inputs, intentionally waits (a tolerance waiting period) for other users to provide inputs, and then processes the received inputs together. That is, the server 302 may put inputs received early from low-latency users on hold while waiting for additional inputs expected to be received later from high-latency users. This buffering method may use a time stamping technique. For example, if the server 302 has multiple users connected to it and the highest latency user has an approximate and/or average latency of about 200 ms, when the server 302 receives an input from a 10 ms latency user, the server 302 may wait about 200 ms for inputs from other users to be received by the server 302. The buffering technique may provide a more fair gaming opportunity to the multiple users whether they have low latency or high latency. However, if a user has too high of a latency, e.g., beyond a tolerance waiting period limit, the server 302 may stop buffering and begin processing the received inputs, such that any input that may be received too late from very-high-latency users would not be processed together with inputs from other users that were received earlier. The above described rewinding techniques, prediction techniques, and/or buffering techniques may be used in conjunction with the present concepts.

Cheating is a prevalent problem in the gaming industry. Cheaters can create unfair and unpleasant gaming experience for other players. The present concepts may implement one or more cheat deterrent techniques. A cheater could manipulate the state information 308 received from the server 302 and send back an altered state information 312 to gain an unfair advantage in the video game. For example, a user playing the first-person shooter video game of FIG. 1 may receive the state information 308 that would result in a missed shot (e.g., the position coordinates of the duck 102 that is off target or a Boolean value indicating that the rifle is off target) from the server 302 but transmit a shoot input 310 along with a manipulated state information 312 (e.g., the position coordinates of the duck 102 that is at the intersection of the crosshairs of the scope 104 or a Boolean value indicating that the rifle is on target) that would fool the server 302 into awarding a target hit for the cheater.

One of the cheat deterrent techniques may include applying a cryptographic digital signature to the state information 308 (whether the contents or the token) that is transmitted from the server 302 to the client 304, such that the server 302 can determine whether the state information 312 that is returned from the client 304 has been tampered. A valid digital signature that is returned with the state information 312 to the server 302 may be proof that the original state information 308 was returned without modification. Otherwise, the server 302 may discard the input 310 that is received along with the state information 312 having an invalid digital signature. Accordingly, a cryptographic digital signature can deter cheaters from altering the state information 308.

Another cheat deterrent technique may involve obfuscating the state information 308 through encryption. That is, encrypting the state information 308 before transmitting it from the server 302 to the client 304 may render the state information 308 incomprehensible to a cheater. The server 302 may discard the input 310 that is received from the client 304 along with the encrypted state information 312 that does not properly decrypt into valid state information. Therefore, it may be extremely difficult or virtually impossible for a cheater to manipulate the encrypted state information 308 received by the client 304 to gain an unfair advantage in the video game.

Another technique for deterring cheating may involve the server 302 accepting a particular state information 312 only one time per user. For instance, a cheater may receive from the server 302 a particular state information 308 corresponding to a hit shot or a successful jump. The cheater could then make a copy of that state information 308, hold onto it, and then transmit that state information 308 back to the server 302, perhaps multiple times, to fool the server 302 into registering hit shots and successful jumps later in time. To deter this type of behavior, the server 302 may generate unique state information 308, for example, by assigning a unique identifier (e.g., a counter, a time stamp, or a large enough random number) to the state information 308. The server 302 may keep track of the state information 312 that have been previously received from the user. Accordingly, the server 302 may be able to detect state information 308 that has been received repeatedly. That is, the server 302 can determine whether a particular state information 312 is being received for the first time. The server 302 may discard the input 310 that is received along with the state information 312 that was previously received.

Another technique for deterring the above described cheating behavior may involve the server 302 accepting the state information 312 in order only. The server 302 may generate the state information 308 in order, for example, by assigning a counter or a time stamp to the state information 308. The server 302 may keep track of the last state information 312 that was received from the user, such that the server 302 can determine whether a particular state information 312 being received from the user is in order or out of order. The server 302 may discard the input 310 that is received along with an out-of-order state information 312. This technique may deter cheaters from holding on to old state information 308 and using it later. Furthermore, any combinations of the above-described cheat deterrent techniques may be used with the present concepts.

In some implementations, the system 300 may include an input device 314. The input device 314 may be any device that is capable of receiving inputs from the user, such as a video game controller, a virtual reality controller, a mouse, a keyboard, a trackpad, a touchpad, a touchscreen, a joystick, etc. The input device 314 may communicate with the client 304 through one or more networks (not shown) that add latency to the communication.

Consistent with the present concepts, the client 304 may transmit a series of state information 316 to the input device 314. The state information 316 that are transmitted from the client 304 to the input device 314 may be the same as the state information 308 that are transmitted from the server 302 to the client 304. That is, the client 304 may forward the series of state information 308 received from the server 302 to the input device 314.

Consistent with the present concepts, when the input device 314 receives an input 318 from the user, the input device 314 may transmit the input 318 along with the corresponding state information 320 to the client 304. The state information 320 may correspond to the input 318, because the state information 320 was the latest in the series of state information 316 that the input device 314 had received when the input device 314 received the input 318 from the user. Alternatively, the state information 320 may correspond to the input 318, because the state information 320 corresponds to the video frame 306 being displayed to the user at the time the input device 314 received the input 318 from the user.

Upon receiving the input 318 and the state information 320 from the input device 314, the client 304 may forward both the input 318 and the state information 320 to the server 302. That is, the input 310 and the state information 312 that are transmitted by the client 304 to the server 302 may be the same as the input 318 and the state information 320 that the client 304 received from the input device 314. In response, the server 302 may process the input 318 based on the state information 320 as though the input 318 had been received when the environment was in a state that corresponds to the state information 320, even though the server 302 may have been modeling the environment is a different state when the input 318 was actually received. Accordingly, the server 302 may manipulate the environment by reacting to the input 318 provided by the user in a way that the user would perceive the latency between the server 302 and the client 304 and the latency between the client 304 and the input device 314 as being effectively erased.

As it should be apparent from the above descriptions in connection with FIG. 3, additional devices between the server 302 (which models the environment) and the input device 314 (which receives inputs from the user) may be daisy-chained so as to reduce or eliminate the delay effects due to latency between the server 302 and the input device 314 and one or more devices therebetween. The intermediary device may forward the state information in the direction from the server 302 to the input device 314, and forward the inputs and corresponding state information in the opposite direction from the input device 314 to the server 302.

The present concepts described may be applicable to multi-user scenarios, i.e., where multiple users are interacting with the same environment, e.g., a multiplayer video game. The server 302 may transmit the series of state information 308 to a plurality of clients 304 that are separated from the server 302 by one or more networks having latency. One of more of the clients 304 may transmit an input 310 and the corresponding state information 312 to the server 302. The server 302 may process and reconcile the plurality of inputs 310 and their corresponding state information 312 that were received together to modify and model the environment.

Figure 4:
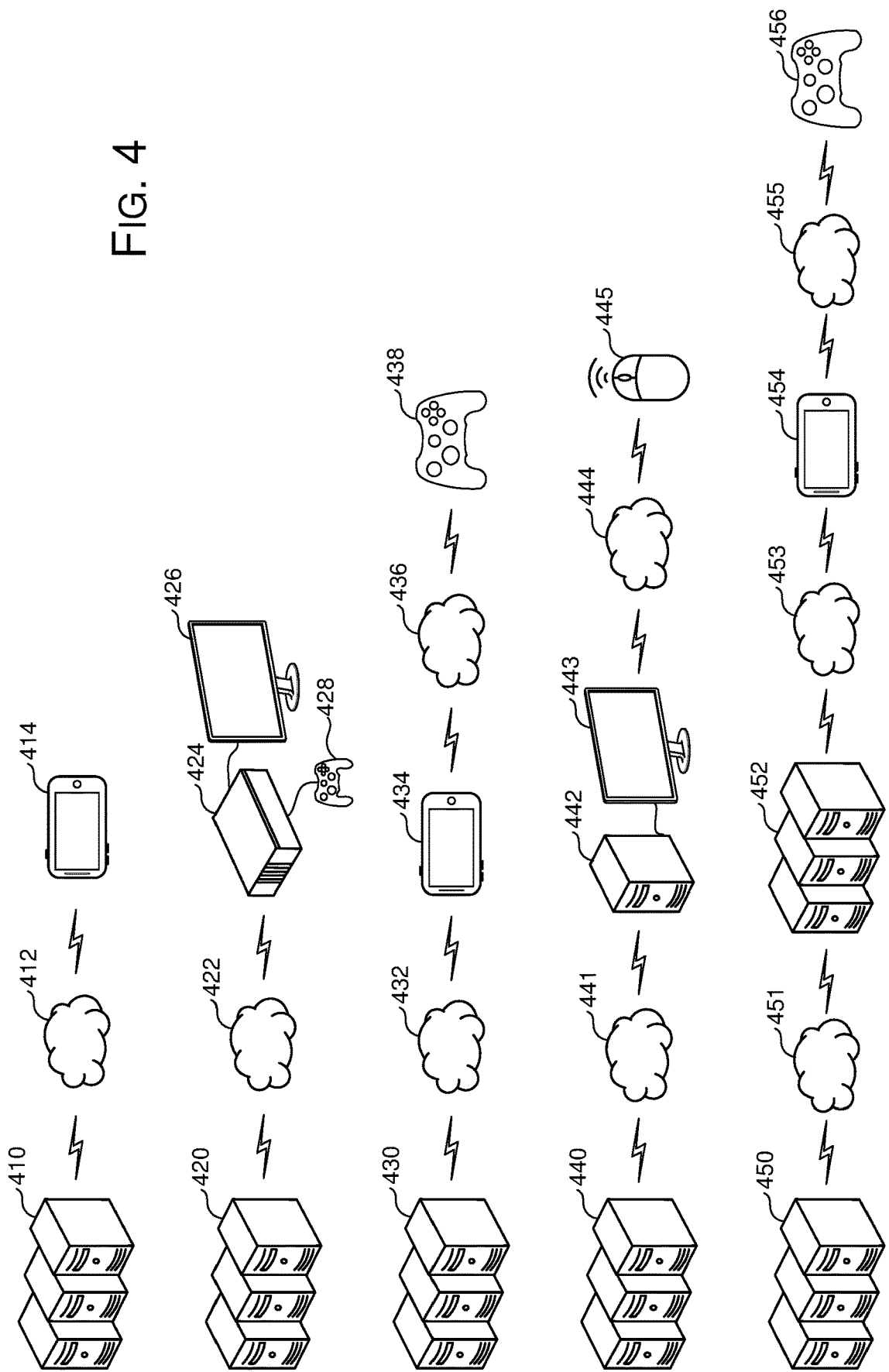
FIG. 4 illustrates example latency scenarios, consistent with the present concepts.

FIG. 4 illustrates example latency scenarios, consistent with the present concepts. These scenarios are provided as mere examples. The applications of the present concepts are not limited to the illustrated scenarios. For instance, the specific types of devices illustrated in FIG. 4 may be swapped with other types of devices. The number of networks in the example scenarios can also vary.

In the first example scenario, a game server 410 may run a virtual game console, which allows a remote user to play games using the virtual game console as though she were sitting in front of a physical game console in her living room. The game server 410 may be connected to a network 412. The user may be using a smartphone 414 as a client that can connect to the game server 410 through the network 412 to play video games running on the game server 410.

The network 412 may be a local area network, a wide area network, a wired network, a wireless network, a cellular network, a Wi-Fi network, a Bluetooth network, the Internet, any other network for exchanging data, or a combination thereof. Depending on the speed, bandwidth, distance, utilization, reliability, and other factors, the network 412 may cause latency in communications between the game server 410 and the smartphone 414. For example, the game server 410 may be located in a data center, the user holding the smartphone 414 may be riding a city bus, and the network 412 may include a cellular network.

In this first example scenario, the game server 410 may model a virtual game environment and transmit corresponding video frames (i.e., stream) to the smartphone 414. The game server 410 may also transmit game state information to the smartphone 414. The smartphone 414 may receive the video frames from the game server 410 and display the video frames to the user. The smartphone 414 may receive an input from the user. For example, the user may provide an input by pressing or holding a button; touching, tapping, or swiping a touchscreen; tilting, rotating, or shaking the smartphone 414; or any combination thereof. In response, the smartphone 414 may transmit the input along with the corresponding game state information to the game server 410. Although only one smartphone 414 and one network 412 are depicted, multiple users may use multiple smartphones 414 to connect to the game server 410 through multiple networks 412. The plurality of users may be co-located and connecting through the same network 412, or they may be located in different places and connecting through different networks 412. The plurality of users may be playing the same multiplayer game or they may be playing different games (i.e., the game server 410 may be running multiple instances of virtual game consoles). The game server 410 may transmit video frames and game state information to the plurality of smartphones 414.

In the second example scenario, a game server 420 may host a multiplayer networked game server, which allows remote users to play games through a network 422 by using a video game console 424 as a client. The game server 420 and the video game console 424 may be connected to the network 422. The video game console 424 may be connected to a display 426, such a monitor or a television, and also connected to a video game controller 428. The network 422 may be a local area network, a wide area network, a wired network, a wireless network, a cellular network, a Wi-Fi network, a Bluetooth network, the Internet, any other network for exchanging data, or a combination thereof. Depending on the speed, bandwidth, distance, utilization, reliability, and other factors, the network 422 may cause latency in communications between the game server 420 and the video game console 424.

In this second example scenario, the game server 420 may model a virtual game environment. In one implementation, the game server 420 may send virtual game environment information to the video game console 424 over the network 422. The video game console 424 may generate video frames based on the virtual game environment information received from the game server 420 and then display the video frames on the display 426 to the user. In an alternative environment, the game server 420 may generate video frames based on the virtual game environment and transmit the video frames (i.e., stream) to the video game console 424. The video game console 424 may receive the video frames from the game server 420 and display the video frames to the user on the display 426.

In the second example scenario, the game server 420 may also transmit game state information to the video game console 424. The video game console 424 may receive an input from the user via the video game controller 428. For example, the user may provide an input by pressing or holding a button; moving or pressing a joystick; tilting, rotating, or shaking the video game controller 428; or any combination thereof. In response, the video game console 424 may transmit the input along with the corresponding game state information to the game server 420. Although only one video game console 424 and one network 422 are depicted, multiple users may use multiple video game consoles 424 to connect to the game server 420 through multiple networks 422, where the game server 420 may be running a multiplayer networked game. The multiple video game consoles 424 may use the same network 422 or different networks 422 to connect to the game server 420.

In the third example scenario, a game server 430, a first network 432, and a smartphone 434 may be set up similarly to the game server 410, the network 412, and the smartphone 414, respectively, in the first example scenario. In the third example scenario, in addition to or alternative to the user providing an input using the smartphone 434, the user may provide an input using a wireless video game controller 438. The user may operate the wireless video game controller 438 in a similar manner to the video game controller 428 in the second example scenario. The wireless video game controller 438 may communicate with the smartphone 434 through a second network 436. The second network 436 may be a local area network, a wide area network, a wired network, a wireless network, a cellular network, a Wi-Fi network, a Bluetooth network, the Internet, any other network for exchanging data, or a combination thereof. For instance, the game server 430 may be located in a data center, the smartphone 434 may be located in the user's home and connected to the user's home Wi-Fi network, the first network 432 may be the Internet that connects the game server 430 in the data center and the smartphone 434 in the user's home, and the second network 436 may be a Bluetooth network that connects the smartphone 434 and the wireless video game controller 438. Depending on the speed, bandwidth, distance, utilization, reliability, and other factors, the first network 432 and/or the second network 436 may cause latency in communications among the game server 430, the smartphone 434, and the wireless video game controller 438.

In this third example scenario, the game server 430 may model a virtual game environment and transmit corresponding video frames (i.e., stream) to the smartphone 434 via the first network 432. The game server 430 may also transmit game state information to the smartphone 434. The smartphone 434 may receive the video frames from the game server 430 and display the video frames to the user. Furthermore, the smartphone 434 may forward (i.e., relay or transmit a copy of) the game state information to the wireless video game controller 438 through the second network 436. The wireless video game controller 438 may receive an input from the user. In response, the wireless video game controller 438 may transmit the input along with the corresponding game state information to the smartphone 434 through the second network 436. In response, the smartphone 434 may forward (i.e., relay or transmit a copy of) the input along with the corresponding game state information to the game server 430.

Although only one wireless video game controller 438 and one second network 436 are depicted, multiple users may use multiple wireless video game controllers 438 to connect to the smartphone 434 through the second network 436. The plurality of users may be co-located and connecting through the same second network 436, or they may be located in different places and connecting through different second networks 436. The smartphone 434 may transmit the game state information to the plurality of wireless video game controllers 438.

In the fourth example scenario, a game server 440, a first network 441, and a personal computer 442 may be set up similarly to the game server 410, the network 412, and the smartphone 414, respectively, in the first example scenario; or the game server 420, the network 422, and the video game console 424, respectively, in the second example scenario. That is, a user may use the personal computer 442 as a client that connects to the game server 440 through the first network 441 to play video games hosted by the game server 440. The personal computer 442 may include a display 443. The user may operate a wireless mouse 445 to provide an input. In alternative implementations, the user may operate a wireless joystick, a wireless virtual reality controller, or any other network-capable device for providing inputs. The wireless mouse 445 may communicate with the personal computer 442 through a second network 444. The second network 444 may be a local area network, a wide area network, a wired network, a wireless network, a cellular network, a Wi-Fi network, a Bluetooth network, the Internet, any other network for exchanging data, or a combination thereof. For instance, the game server 440 may be located in a data center, the personal computer 442 may be located at the user's home, the first network 441 may be the Internet that connects the game server 440 in the data center and the personal computer 442 at the user's home, and the second network 444 may be a Bluetooth network that connects the personal computer 441 and the wireless mouse 445. Depending on the speed, bandwidth, distance, utilization, reliability, and other factors, the first network 441 and/or the second network 444 may cause latency in communications among the game server 440, the personal computer 442, and the wireless mouse 445.

In this fourth example scenario, the game server 440 may model a virtual game environment. In one implementation, the game server 440 may send virtual game environment information to the personal computer 442 over the first network 441. The personal computer 442 may generate video frames based on the virtual game environment information received from the game server 440 and then display the video frames on the display 443 to the user. In an alternative environment, the game server 440 may generate video frames based on the virtual game environment and transmit the video frames (i.e., stream) to the personal computer 442. The personal computer 442 may receive the video frames from the game server 440 and display the video frames to the user on the display 443.

In the fourth example scenario, the game server 440 may also transmit game state information to the personal computer 442 through the first network 441. Furthermore, the personal computer 442 may forward (i.e., relay or transmit a copy of) the game state information to the wireless mouse 445 through the second network 444. The wireless mouse 445 may receive an input from the user. In response, the wireless mouse 445 may transmit the input along with the corresponding game state information to the personal computer 442 through the second network 444. In response, the personal computer 442 may forward (i.e., relay or transmit a copy of) the input along with the corresponding game state information to the game server 440.

In the fifth example scenario, a multiplayer game server 450 may be connected to a first network 451. The multiplayer game server 450 may host a multiplayer game (e.g. similar to the game server 420 in the second example scenario), which allows remote users to play the multiplayer game through the first network 451 by using a physical video game console (e.g., the video game console 424 in the second example scenario) or a virtual video game console (e.g., the game server 410 in the first example scenario) as a client. In this fifth example scenario, a virtual game console server 452 may be connected to the first network 451 to communicate with the multiplayer game server 450. The virtual game console server 452 may run a virtual game console, which allows a remote user to play the multiplayer game using the virtual game console as though she were sitting in front of a physical game console in her living room. The virtual game console server 452 may be connected to a second network 453. The user may be using a smartphone 454 as a client (with respect to the virtual game console server 452) that can connect to the virtual game console server 452 through the second network 453 to play the multiplayer game running on the multiplayer game server 450. Furthermore, the user may provide an input using a wireless video game controller 456. The user may operate the wireless video game controller 456 in a similar manner to the video game controller 428 in the second example scenario. The wireless video game controller 456 may communicate with the smartphone 454 through a third network 455.

The first network, 451, the second network 453, and/or the third network 455 may be a local area network, a wide area network, a wired network, a wireless network, a cellular network, a Wi-Fi network, a Bluetooth network, the Internet, any other network for exchanging data, or a combination thereof. Depending on the speed, bandwidth, distance, utilization, reliability, and other factors, the first network, 451, the second network 453, and/or the third network 455 may cause latency in communications among the multiplayer game server 450, the virtual game console server 452, the smartphone 454, and the wireless video game controller 456.

In this fifth example scenario, the multiplayer game server 450 may model a virtual game environment. In one implementation, the multiplayer game server 450 may transmit virtual game environment information to the virtual game console server 452 over the first network 451. The virtual game console server 452 may generate video frames based on the virtual game environment information received from the multiplayer game server 450 and then transmit the video frames (i.e., stream) to the smartphone 454 over the second network 453 to be displayed to the user. In an alternative environment, the multiplayer game server 450 may generate video frames based on the virtual game environment and transmit the video frames to the virtual game console server 452. The virtual game console server 452 may forward (i.e., relay or transmit a copy of) the video frames received from the multiplayer game server 450 to the smartphone 454 to be displayed to the user.

In the fifth example scenario, the multiplayer game server 450 may also transmit game state information to the virtual game console server 452. The virtual game console server 452 may forward (i.e., relay or transmit a copy of) the game state information to the smartphone 454. The smartphone 454 may forward (i.e., relay or transmit a copy of) the game state information to the wireless video game controller 456 through the third network 455. The wireless video game controller 456 may receive an input from the user. In response, the wireless video game controller 456 may transmit the input along with the corresponding game state information to the smartphone 454 through the third network 455. In response, the smartphone 454 may forward (i.e., relay or transmit a copy of) the input along with the corresponding game state information to the virtual game console server 452. In response, the virtual game console server 452 may forward (i.e., relay or transmit a copy of) the input along with the corresponding game state information to the multiplayer game server 450.

In the five example scenarios of FIG. 4, the server (i.e., the game server 410, the game server 420, the game server 430, the game server 440, or the multiplayer game server 450) that models the virtual game environment may transmit a series of the game state information and may receive the input along with the corresponding game state information. Furthermore, the device that the user uses to provide the input (i.e., the smartphone 414, the wireless video game controller 438, the wireless mouse 445, or the wireless video game controller 456) may receive the series of game state information and may transmit the input along with the corresponding game state information (or, in the case of the video game controller 428, the device that the user uses to provide the input is not separated from the device that receives the game state information by a network). Accordingly, the latency effects caused by one or more networks between the server that models the virtual game environment and the device that the user uses to provide the input may be erased. Moreover, although the scenarios provided above involved a server and a client, the present concepts may be implemented in peer-to-peer scenarios where multiple peer-to-peer users are separated by latency.

Figure 5:
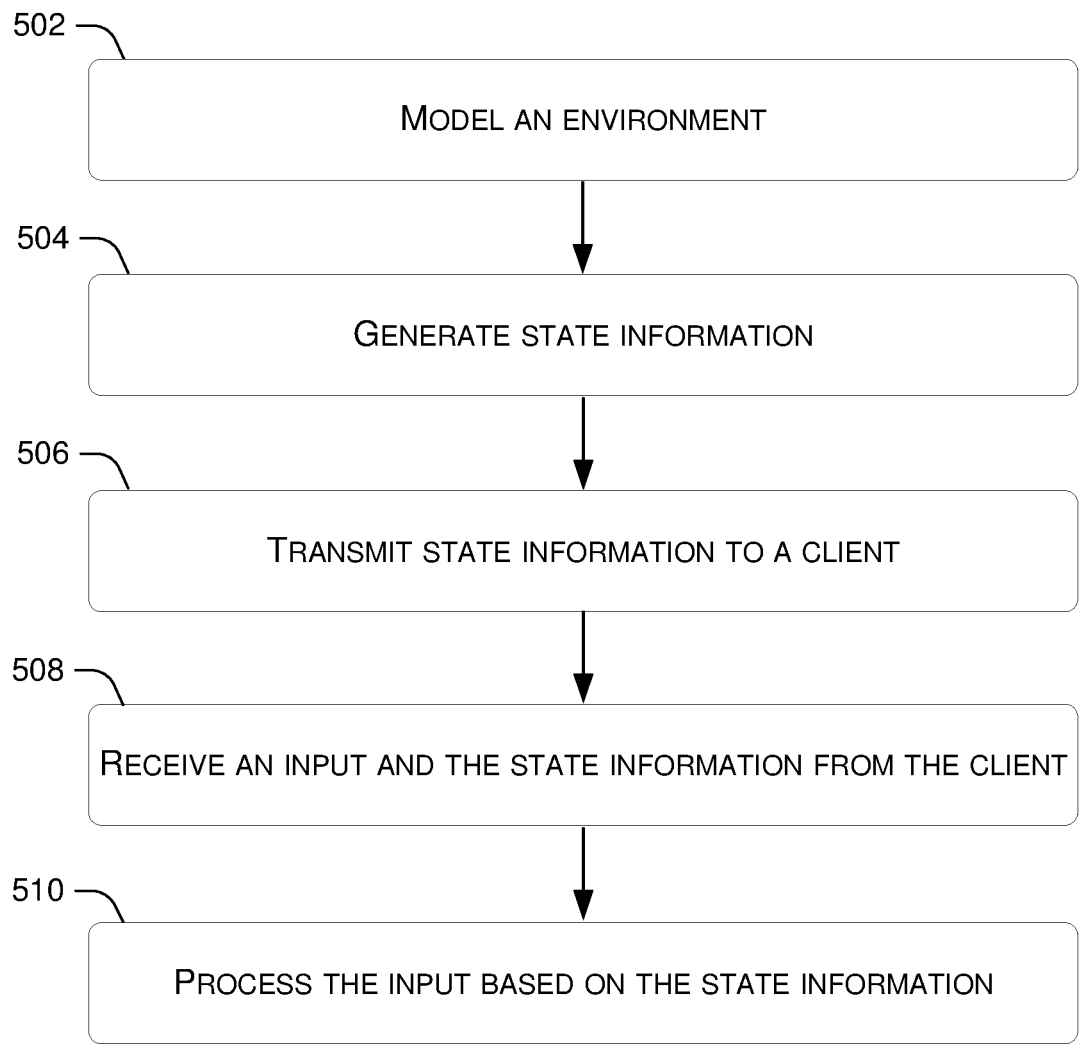
FIGS. 5 and 6 show flowcharts illustrating latency erasing methods, consistent with the present concepts.

FIG. 5 shows a flowchart illustrating an example latency erasing server method 500, consistent with the present concepts. For example, the game server 410, the game server 420, the game server 430, the game server 440, and/or the multiplayer game server 450 may implement the latency erasing server method 500.

In act 502, a server may model an environment. Depending on the context, the server may model a real-life environment or a virtual environment. For example, a video game server may model a virtual video game environment that includes virtual objects. In some implementations, the server may model the environment in various states as time progresses. For example, a video game character or a video game object may change position over time.

In act 504, the server may generate state information. The contents of the state information may include some information about the environment. For example, the state information may include the position coordinates of a video game character. Consistent with the present concepts, the state information may include information that would be relevant to or required to process an input that may be received from the user.

In act 506, the server may transmit the state information to a client. The server and the client may be separated by a network, such that communications between the two involve latency. In some implementations, the server may transmit the contents of the state information (e.g., the position coordinates of the video game character) to the client. In other implementations, the server may transmit a token that is associated with the contents of the state information to the client, while the server stores the contents and the associated token.

In some implementations, one or more of the acts 502, 504, and/or 506 may repeat as the server continues to model the environment that changes, generates a series of state information consistent with the changing environment, and transmits the series of state information (whether the contents or the tokens) to the client. The server may also be performing other functions while it performs acts 502, 504, and/or 506. For example, the server may be generating and transmitting other information regarding the environment to the client, such as video frames, audio, haptic feedback, etc.

In act 508, the server may receive an input together with the state information from the client. The input may have been provided by a user who is interacting with the client to cause a change in the environment modeled by the server. For example, the user may provide the input to change the video game character while playing a video game hosted by the server. The state information that is received by the server from the client may be the latest state information that the client received from the server. Alternatively, the state information that is received by the server from the client may correspond to an older state of the environment compared to the latest state information that was received by the client from the server.

In act 510, the server may process the input based on the state information received from the client along with the input. That is, rather than processing the input based on the state of the environment at the time the input was received by the server, the server may manipulate the environment in response to the input in accordance with a previous state of the environment that corresponds to the state information received from the client. Accordingly, the server may react to the input as though it were received earlier in time than it actually was. Thus, delayed reactions that users often perceive with conventional techniques can be reduced or eliminated.

Figure 6:
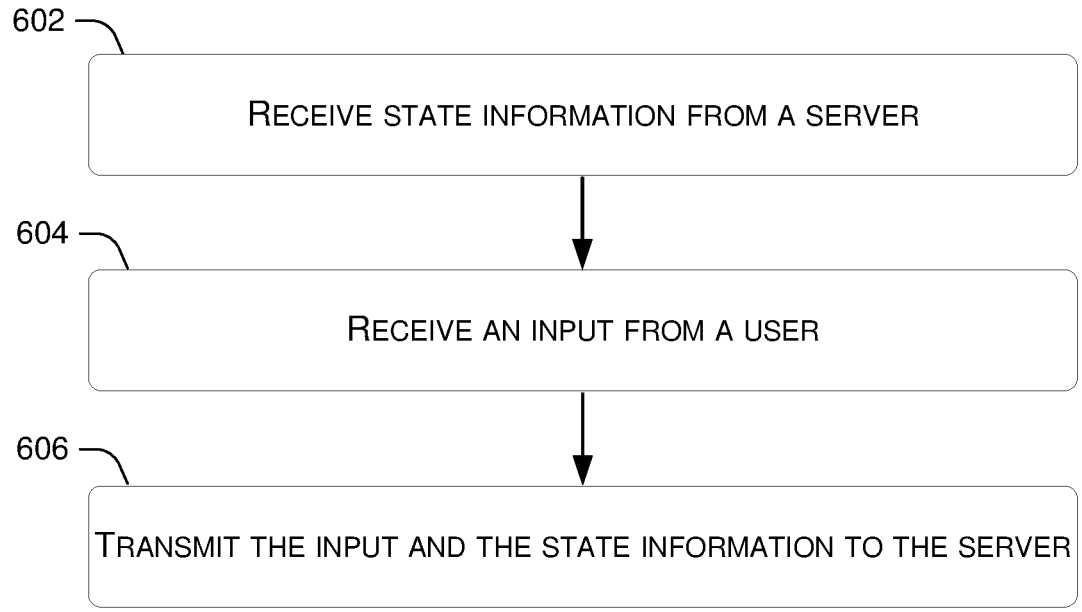

FIG. 6 show a flowchart illustrating a latency erasing client method 600, consistent with the present concepts. For example, the smartphone 414, the video game console 424, the wireless video game controller 438, the wireless mouse 445, the wireless video game controller 456 may implement the latency erasing client method 600. The latency erasing server method 500 and the latency erasing client method 600 may be performed together to achieve the present concepts.

In act 602, a client may receive state information from a server. For example, the server may model an environment whose state changes, and the server may generate a series of state information that is transmitted to the client. The state information received by the client may include contents (such as, information about the environment), or it may be a token that is associated with the contents stored in the server. The client and the server may be connected through a network, such that there is a latency in the communications between the client and the server.

In some implementations, the client may also receive environment information from the server, such as video frames, audio, haptic feedback, etc. The client may output such environment information to a user, such that the user may interact with the environment.

In act 604, the client may receive an input from the user. For example, the user may provide the input while playing a video game hosted by the server. The client itself may have a mechanism for the user to provide the input, such as a button, a touchscreen, a joystick, etc. Furthermore, the client may be connected to an input device that the user can use to provide the input. The input device may be connected to the client physically or may be communicably coupled to the client via wire or wirelessly.

In act 606, the client may transmit the input along with the corresponding state information to the server. The state information that is transmitted from the client to the server may correspond to the input, because the state information was the latest in the series of state information that the client had received from the server when the client received the input from the user. Alternatively, the state information that is transmitted from the client to the server may correspond to the input, because the state information corresponds to the environment information being output to the user at the time the client received the input from the user.

Consistent with some implementations of the present concepts, the client need not necessarily interpret the state information. The client may receive the series of state information from the server and, in response to receiving an input from the user, the client may transmit the input along with the latest state information to the server. The state information may be encrypted. The client may not need to decrypt the state information.

Figure 7:
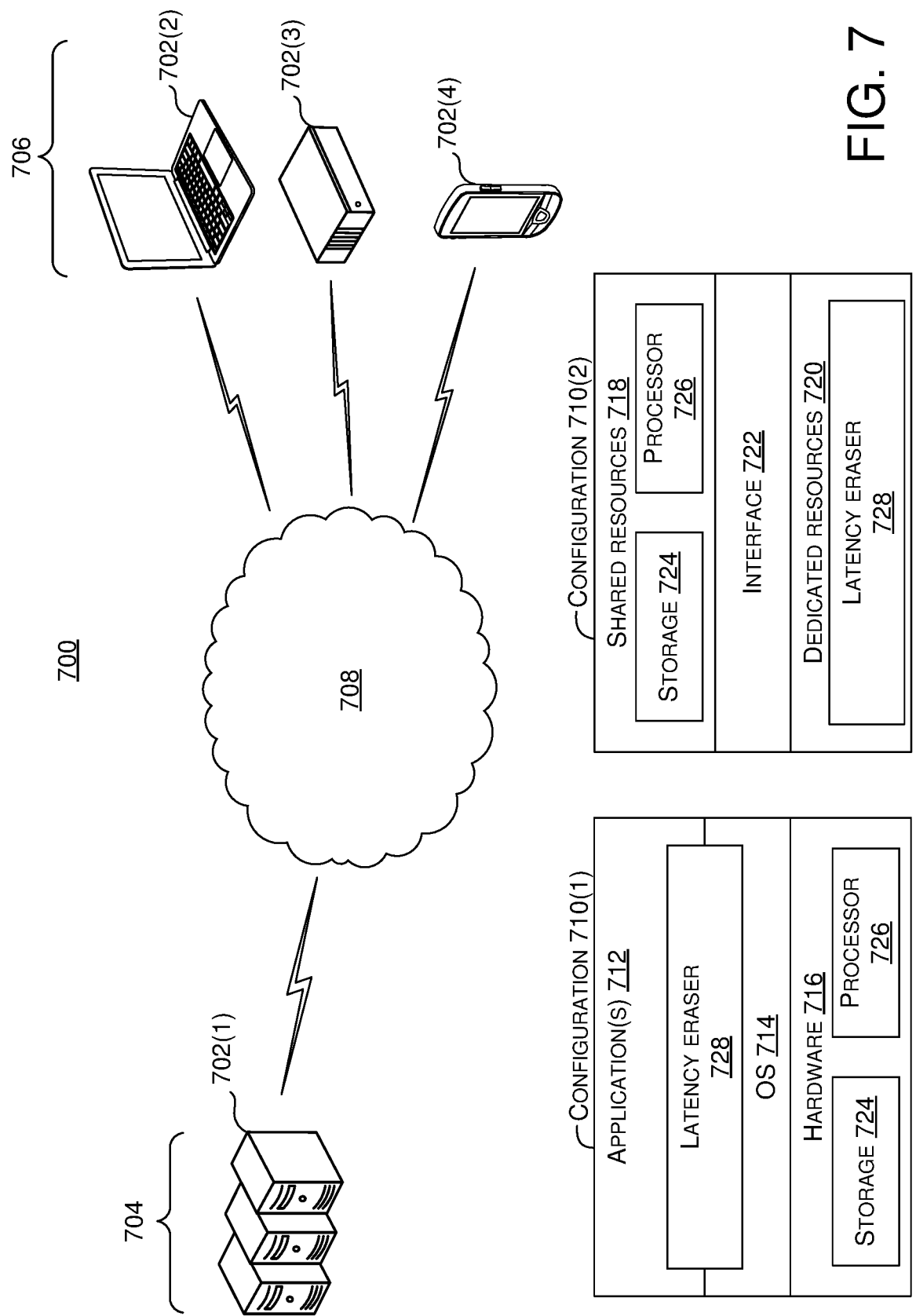
FIG. 7 shows example configurations of a latency erasing system, consistent with the present concepts.

FIG. 7 shows example configurations of a latency erasing system 700, in which some implementations of the present concepts may be used. For purposes of explanation, the example latency erasing system 700 includes devices 702. Examples of devices 702 can include traditional computing devices, such as personal computers, desktop computers, servers, notebook computers, cellular phones, smartphones, personal digital assistants, pad type computers, mobile computers, cameras, appliances, virtual reality headsets, video game consoles, controllers, smart devices, IoT devices, vehicles, etc., and/or any of a myriad of ever-evolving or yet to be developed types of electronic devices.

In the example shown in FIG. 7, the devices 702 may include a server device 702(1) (or a collection of servers), a laptop 702(2), a video game console 702(3), and a smartphone 702(4). For purposes of explanation, device 702(1) can be viewed as being a server-side device 704 (or cloud-based resource), and devices 702(2)-702(4) can be viewed as being client-side devices 706 (or client devices). The number of devices and the client-versus-server side of the devices described and depicted are intended to be illustrative and non-limiting. The devices 702 can communicate with one another via one or more networks 708 and/or can access the Internet over the one or more networks 708.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

In some implementations, the server-side device 704 may perform the latency erasing server method 500, and one or more of the client-side devices 706 may perform the latency erasing client method 600, for example, to eliminate or reduce certain effects of latency caused by the network 708. The server-side device 704 may model an environment. One or more of the client-side devices 706 may receive inputs from users and transmit the inputs to the server-side device 704. For example, the server-side device 704 may model a virtual video game environment, and a user may be playing the video game using one or more of the client-side devices 706. Consistent with the present concepts, the server-side device 704 may transmit a series of state information regarding the environment to the client-side device 706, and the client-side device 706 may return the state information along with an input to the server-side device 704.

FIG. 7 shows two device configurations 710(1) and 710(2) that can be employed by any or all of the devices 702. Individual devices 702 can employ either of the configurations 710(1) or 710(2), or an alternate configuration. One instance of each configuration 710 is illustrated in FIG. 7. Briefly, device configuration 710(1) may represent an operating system (OS) centric configuration. Configuration 710(2) may represent a system on a chip (SOC) configuration. Configuration 710(1) can be organized into one or more applications 712, operating system 714, and hardware 716. Configuration 710(2) may be organized into shared resources 718, dedicated resources 720, and an interface 722 there between.

In either configuration 710, the device 702 can include a storage 724 and a processor 726. The device 702 can also include a latency eraser 728. For instance, the latency eraser 728 in the server-side device 704 may implement the latency erasing server method 500, and the latency eraser 728 in the client-side device 706 may implement the latency erasing client method 600.

As mentioned above, configuration 710(2) can be thought of as a system on a chip (SOC) type design. In such a case, functionality provided by the device can be integrated on a single SOC or multiple coupled SOCs. One or more processors 726 can be configured to coordinate with shared resources 718, such as storage 724, etc., and/or one or more dedicated resources 720, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Although many of the example implementations of the present concepts provided above were explained in the context of video games for the purpose of illustration, the present concepts have a wide range of applications. For example, the effects of latency may be erased in the context of virtual reality environments and augmented reality environments, as well as real-life environments that can be modeled by a computer and remotely observed and manipulated by a user with latency.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A system, comprising:
a hardware processor; and
storage having instructions which, when executed by the hardware processor, cause the hardware processor to:
model a virtual game environment through a series of game states at a series of time periods, the series of game states including a first game state associated with a first time period and a second game state associated with a second time period that occurs after the first time period;
generate first game state information corresponding to the first game state;
transmit the first game state information to a client device;
receive a communication from the client device at the second time period when the virtual game environment is in the second game state, the communication including an input and the first game state information; and
responsive to receiving the communication from the client device when the virtual game environment is in the second game state, modify the virtual game environment by applying the input to the first game state.

2. The system of claim 1, wherein the instructions further cause the hardware processor to:
generate a first video frame corresponding to the first game state; and
transmit the first video frame to the client device along with the first game state information.

3. The system of claim 1, wherein the instructions further cause the hardware processor to:
generate a first token associated with the first game state, wherein the first game state information includes the first token.

4. The system of claim 1, wherein the instructions further cause the hardware processor to:
digitally sign the first game state information, wherein the first game state information transmitted to the client device has a digital signature;
receive the digital signature along with the first game state information received from the client device;
validate the digital signature; and
discard the input upon determining that the digital signature received from the client device is invalid.

5. The system of claim 1, wherein the instructions further cause the hardware processor to:
encrypt the first game state information, wherein the first game state information transmitted to the client device is encrypted and the first game state information received from the client device is encrypted.

6. A computer-readable storage medium storing instructions which, when executed by a hardware processor, cause the hardware processor to:
receive a series of video frames from a server;
receive a series of state information from the server, the series of state information corresponding to the series of video frames;
display the series of video frames in sequence to a user;
receive a user input while a particular video frame is displayed to the user; and
transmit the user input and particular state information to the server, the particular state information corresponding to the particular video frame.

7. The computer-readable storage medium of claim 6, wherein the instructions further cause the hardware processor to:
connect to the server through a network having latency.

8. The computer-readable storage medium of claim 6, wherein the instructions further cause the hardware processor to:
transmit the series of state information received from the server to an input device; and
receive the user input along with the particular state information from the input device.

9. The computer-readable storage medium of claim 8, wherein the user input and the particular state information transmitted to the server were received from the input device.

10. The computer-readable storage medium of claim 8, wherein the instructions further cause the hardware processor to:
connect to the input device through a network having latency.

11. A method, comprising:
modeling an environment in a first state;
generate first state information based at least on the first state;
transmitting the first state information to a client;
modeling the environment to transition from the first state to a second state;
when the environment is in the second state, receiving a communication comprising the first state information and a first input received by the client when the environment was presented by the client in the first state; and
responsive to receiving the communication when the environment is in the second state, changing the environment in response to the first input based at least on the first state.

12. The method of claim 11, wherein the first state information includes one or more of a Boolean value, a scalar, a vector, a list, or a matrix relating to the first state of the environment.

13. The method of claim 11, wherein the environment is a virtual video game world and the first state information includes a variable describing the virtual video game world according to the first state.

14. The method of claim 11, wherein the first state information includes a token that corresponds to the first state.

15. The method of claim 14, further comprising:
storing the token in correspondence with the first state.

16. The method of claim 11, further comprising:
digitally signing the first state information,
wherein the first state information transmitted to the client and received from the client includes a digital signature.

17. The method of claim 16, further comprising:
determining whether the digital signature received from the client is valid; and
discarding the first input received along with the first state information and the digital signature upon determining that the digital signature is invalid.

18. The method of claim 11, further comprising:
encrypting the first state information,
wherein the first state information transmitted to the client and received from the client is encrypted.

19. The method of claim 11, further comprising:
receiving a second input along with the first state information after the first input along with the first state information was previously received; and
discarding the second input.

20. The method of claim 11, further comprising:
generating second state information based at least on the second state;
transmitting the second state information to the client;
modeling the environment to transition from the second state to a third state;
generating third state information based at least on the third state;
transmitting the third state information to the client;
receiving the third state information from the client;
receiving a second input along with the second state information after the third state information was previously received; and
discarding the second input.

* * * * *